United States Patent [19]

Tanaka

[11] Patent Number: 5,308,164

[45] Date of Patent: May 3, 1994

[54] LINEAR MOTION ROLLING GUIDE UNIT

[75] Inventor: Kazuhiko Tanaka, Fuchu, Japan

[73] Assignee: Nippon Thompson, Co., Ltd., Tokyo, Japan

[21] Appl. No.: 10,864

[22] Filed: Jan. 29, 1993

[30] Foreign Application Priority Data

Jan. 31, 1992 [JP] Japan .................................. 4-40718

[51] Int. Cl.⁵ ............................................. F16C 31/06
[52] U.S. Cl. ......................................... 384/13; 384/44
[58] Field of Search ................. 384/13, 43, 44, 45, 384/462, 475; 464/168

[56] References Cited

U.S. PATENT DOCUMENTS

| | | | |
|---|---|---|---|
| 1,356,494 | 10/1920 | Golden | 384/462 |
| 4,461,518 | 7/1984 | Tanaka | 384/44 |
| 4,634,295 | 1/1987 | Agari | 384/44 |
| 4,799,805 | 1/1989 | Tanaka | 384/44 |
| 5,129,736 | 7/1992 | Tanaka | 384/44 X |

FOREIGN PATENT DOCUMENTS 1-175564  7/1989  Japan .
4-63812  5/1992  Japan .

Primary Examiner—Daniel P. Stodola
Assistant Examiner—Paul T. Bowen
Attorney, Agent, or Firm—Browdy and Neimark

[57] ABSTRACT

The linear motion rolling guide unit according to this invention has the casing mounted on the track rail so that it can be moved along the track rail. The end caps formed with the recessed arc surfaces for the direction changing passages are attached to the ends of the casing. To form the direction changing passages, the spacers are disposed so that they face and are spaced from the recessed arc surfaces of the end caps. A number of rollers circulate through the raceways formed between the track rail and the casing and through the direction changing passages. The roller-contacting surfaces of the spacers are formed with oil grooves that extend in the direction of roller movement. The oil grooves act as an escape for grease and also hold grease therein, thus reducing the sliding resistance.

4 Claims, 4 Drawing Sheets

LINEAR MOTION ROLLING GUIDE UNIT

BACKGROUND OF THE INVENTION

1. Field of the Invention

The present invention relates to a linear motion rolling guide unit which is applied to sliding portions of machining tools and which consists of a track rail with raceway grooves formed longitudinally extending on both side walls thereof, a casing saddling the track rail and having raceway grooves, and a number of rolling elements that roll between the facing raceway grooves.

2. Description of the Prior Art

In a conventional linear motion rolling guide unit, a slider that slides on a track rail consists of a casing, end caps fixed to both ends of the casing, end seals attached to the end caps, and an under seal provided to the undersides of the casing and the end caps. The linear motion rolling guide unit further consists of: a number of rolling elements that travel rolling in a raceway formed between the raceway surface on the track rail and the raceway surface on the casing; and a retainer fixed to the casing to hold the rolling elements in the casing.

The linear motion rolling guide unit as described above will be explained by referring to FIGS. 5, 6 and 7. FIG. 5 is a perspective view showing one example of a conventional linear motion rolling guide unit. FIG. 6 is a cross section of FIG. 5 taken along the line A—A, and FIG. 7 is a cross section taken along the line B—B of FIG. 6. The linear motion rolling guide unit shown in FIG. 5 is a four-raceway endless linear motion rolling guide unit. It has a track rail 1 with an I-shaped cross section, a slider 2 straddling the track rail 1 in such a way that it can move relative to or slide on the track rail 1, and a number of cylindrical rolls 5 rotatably interposed between the track rail 1 and the slider 2. The track rail 1 is formed with recessed grooves 8 longitudinally extending on both sides thereof, which form raceway surfaces 9. A recessed portion 11 of the casing 4 is formed with a raceway surface 10 (FIG. 7) at a position facing the raceway surface 9 on the track rail 1.

The slider 2 has a casing 4 which is formed with the recessed portion 11 so that the casing can saddle the track rail 1, and end caps 6 attached to both longitudinal ends of the casing 4. To seal the boundary between the track rail 1 and the slider 2 when the slider 2 slides on the track rail 1, the ends of the end caps 6 are each provided with an end seal (not shown) and the underside of the slider 2 with an under seal 25C.

Between the upper and lower raceway surfaces 10 of the casing 4 is formed an engagement groove 15, which engages with an engagement projection 16 formed on the retainer 3. A part of the retainer 3 is loosely fitted in the recessed groove 8 of the track rail 1 and fixed to the casing 4 by bolts 17.

In the above construction of the 4-raceway endless linear motion rolling guide unit, two raceways are formed on each side of the track rail by the upper and lower raceway surfaces 9 on the track rail 1 and the upper and lower raceway surfaces 10 on the casing 4. Hence, a total of four raceways are formed on both sides of the track rail 1. In these loaded roller raceways, a number of cylindrical rollers 5 roll in contact with the facing raceway surfaces 9 and 10. The casing 4 is formed with return passages 13, 14, and the end caps 6 are formed with direction changing passages 12 that connect the loaded roller raceways and the return passages 13, 14. To form the direction changing passage 12, the end cap 6 is formed on its inner side with an recessed arc surface 19, as shown in FIG. 7. A direction changing passage spacer 7 is disposed facing, and spaced from, the recessed arc surface 19 to define the direction changing passage 12. FIG. 7 shows only one of the endless circulating passage.

With the 4-raceway endless linear motion rolling guide unit, the loaded roller raceways, the direction changing passages 12 and the return passages 13, 14 combine to form two endless circulating passages. The endless circulating passages may, for example, have different lengths and be disposed one inside the other. That is, a smaller endless circulating passage may be arranged inside the loop of a larger endless circulating passage and disposed at right angles with each other so that they will not interfere with each other. The larger and smaller endless passages have the same length of the loaded roller raceways. As the slider 2 moves along the track rail 1, the cylindrical rollers 5 circulate through the large and small endless circulating passages. It is also possible to make the endless circulating passages cross each other so that they can be formed in the same length.

Such a four-raceway endless linear motion rolling guide unit is cited, for example, in the Japanese Patent Laid-Open No. 175564/1989, Japanese Utility Model Laid-Open No. 63812/1992, and Japanese Patent application No. 166326/1991.

In the conventional four-raceway endless linear motion rolling guide unit, the direction changing passage 12 is defined by interposing the spacer 7 between the casing 4 and the recessed arc surface 19 when the end caps 6 are attached to the casing 4. The direction changing passage 12 is supplied with grease as lubricant to make the rolling of the cylindrical rollers 5 smooth. However, a problem may arise that as a large number of rollers 5 travel through the direction changing passage 12, the grease sealed into the passage 12 may cause large rolling friction, i.e., sliding resistance between the rollers 5 and the spacer 7.

SUMMARY OF THE INVENTION

A primary object of this invention is to solve the above-mentioned problems and to provide a linear motion rolling guide unit, which is characterized in that a spacer interposed between the casing and the recessed arc surface for the direction changing passage is formed with an escape for the lubricating grease sealed into the direction changing passage in order to prevent large rolling friction or friction resistance from occurring between the rollers and the direction changing passage spacer and to provide a mold relief function to minimize the deformation of the spacer when it is formed of resin.

The linear motion rolling guide unit according to this invention comprises: a track rail having raceway surfaces formed longitudinally extending on both side walls thereof; a casing movable along the track rail and having raceway grooves formed at positions facing the raceway grooves on the track rail; end caps attached to the longitudinal ends of the casing and each having a recessed arc surface for the direction changing passage; a spacer so disposed that it faces, and is spaced from, the recessed arc surface in the end cap, the spacer and the end cap together forming a direction changing passage; a number of rollers circulating through the raceways formed between the facing raceway surfaces and through the direction changing passages and the return passages formed in the casing; and an oil groove formed in the roller contact surface of the spacer in a direction that the roller travels.

In this linear motion rolling guide unit, since the oil groove, i.e. an oil escape, is formed in the roller contact surface of the spacer along the direction of roller travel, the grease supplied to the roller contact surface can escape into the oil groove as the roller moves in the raceway. This eliminates a drawback experienced with the conventional rolling guide unit that with no escape, the grease is unavoidably sealed in the roller contact surface. As a result, the sliding resistance of the roller contact surface can be reduced substantially ensuring the smooth motion of the rollers.

Further, since grease is retained in the oil groove formed in the spacer, the grease can be supplied to the roller contact surface as the rollers move, improving the lubricating condition. Moreover, in forming the spacer from resin or metal, the oil groove helps prevent deformation of the spacer, thus assuring high precision in forming.

DETAILED DESCRIPTION OF EMBODIMENTS

Figure 1:
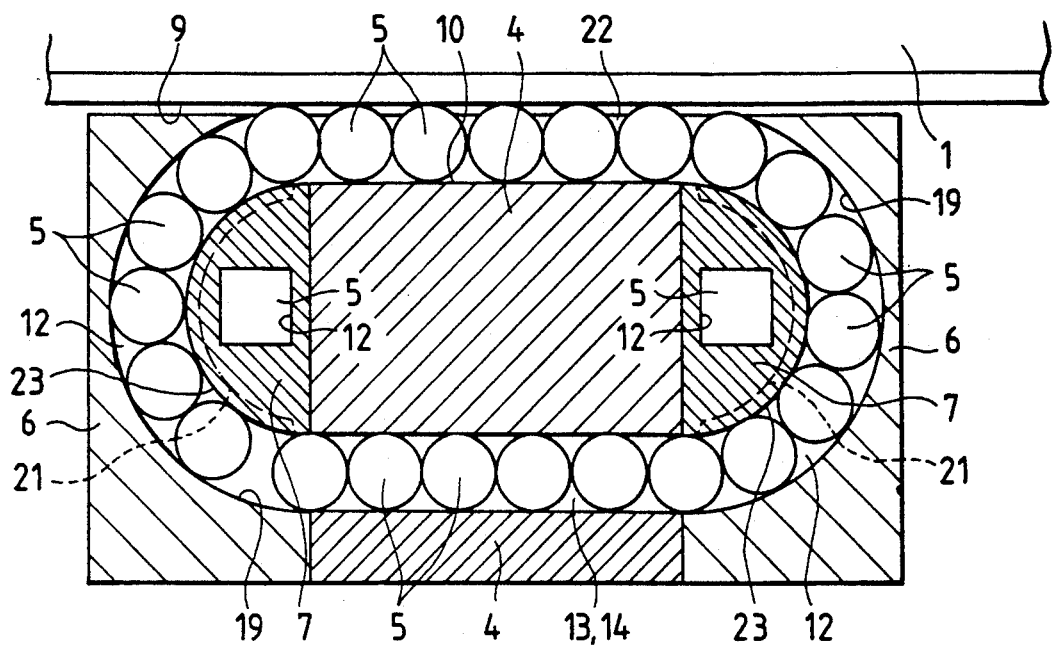
FIG. 1 is a cross section of the linear motion rolling guide unit as one embodiment of this invention.
Figure 2:
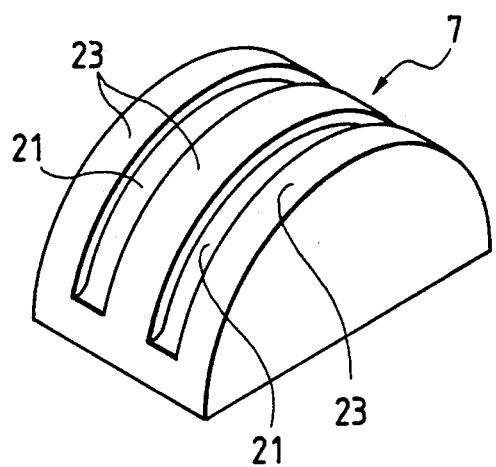
FIG. 2 is a perspective view of an example of the direction changing passage spacer built into the linear motion rolling guide unit of FIG. 1.
Figure 7:
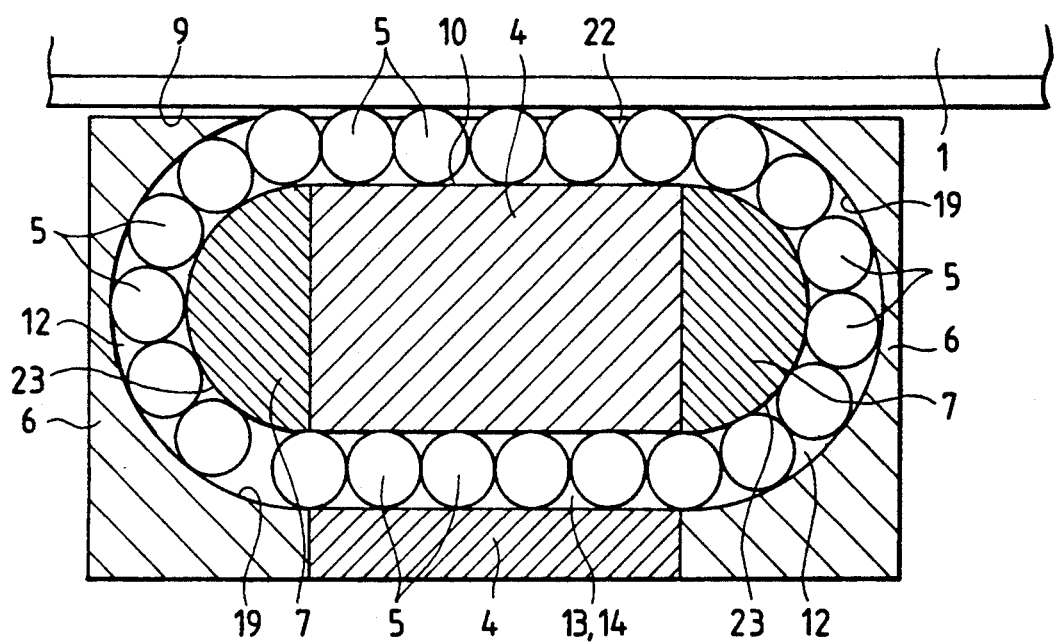
FIG. 7 is a cross section taken along the line B—B of FIG. 6.

Now, by referring to the accompanying drawings, embodiments of the linear motion rolling guide unit according to this invention will be described. FIG. 1 is a cross section showing one embodiment of the linear motion rolling guide unit according to this invention. FIG. 2 is a perspective view of the direction changing passage spacer built into the linear motion rolling guide unit of FIG. 1. In FIGS. 1 and 2, components that have the same functions as those in FIG. 7 are assigned like reference numerals. FIG. 1 shows only one of the endless circulation passages.

The linear motion rolling guide unit of this invention has basically the same construction as that shown in FIG. 7, except that it has a direction changing passage spacer.

This linear motion rolling guide unit consists of: a track rail 1 formed with raceway surfaces 9 longitudinally extending on both side walls thereof; a casing 4 slidable relative to the track rail 1 and having raceway surfaces 10 formed at positions facing the raceway surfaces 9 on the track rail; end caps 6 attached to the longitudinal ends of the casing 4 and each formed with a recessed arc surface 19 for the direction changing passage; a direction changing passage spacer 7 so disposed that it faces, and is spaced from, the recessed arc surface 19 in the end cap 6; and a number of cylindrical rollers 5 circulating through the raceways 22 formed between the facing raceway surfaces 9, 10 and through the direction changing passages 12 and the return passages 13, 14. The spacer 7 is formed with a roller contact surface 23, which is a raised arc surface corresponding to the shape of the recessed arc surface 19 in the end cap 6. Between the roller-contacting raised arc surface 23 of the spacer 7 and the recessed arc surface 19 in the end cap 6 is formed a direction changing passage 12.

In the above construction, the linear motion rolling guide unit is characterized in that one or more oil grooves 21 are formed in the roller-contacting raised arc surface 23 of the spacer 7 in the direction of travel of the cylindrical roller 5. The oil groove 21, as shown in FIG. 2, may be formed as multiple grooves extending in the moving direction of the rollers 5, or, though not shown, may be formed inclined. It is also possible to mix the longitudinally extending grooves and the inclined grooves.

Figure 3:
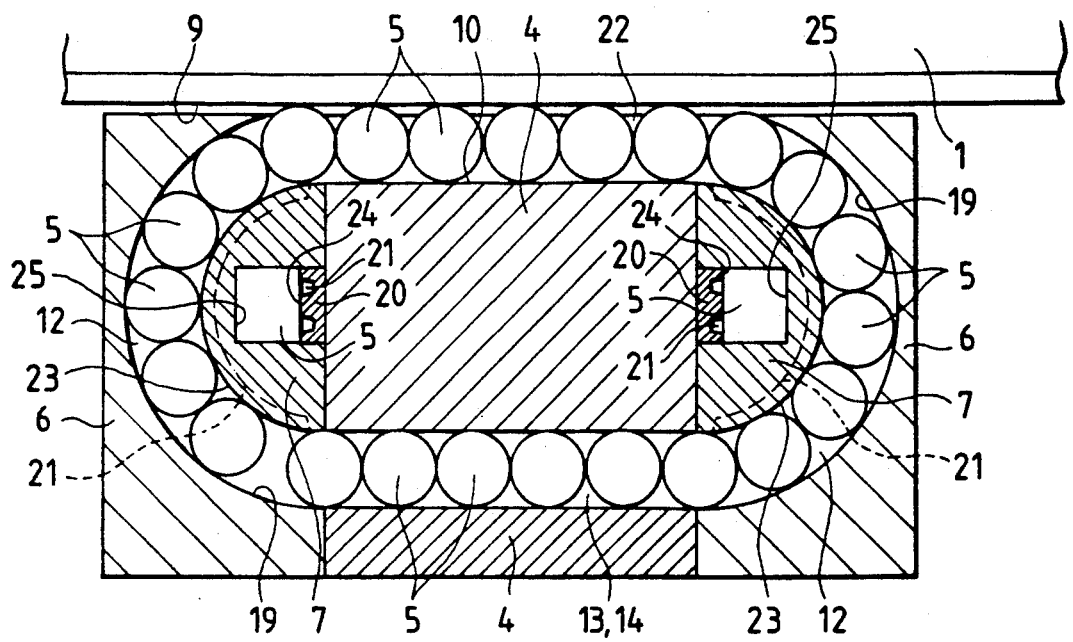
FIG. 3 is a cross section of the linear motion rolling guide unit as another embodiment of the invention.
Figure 4:
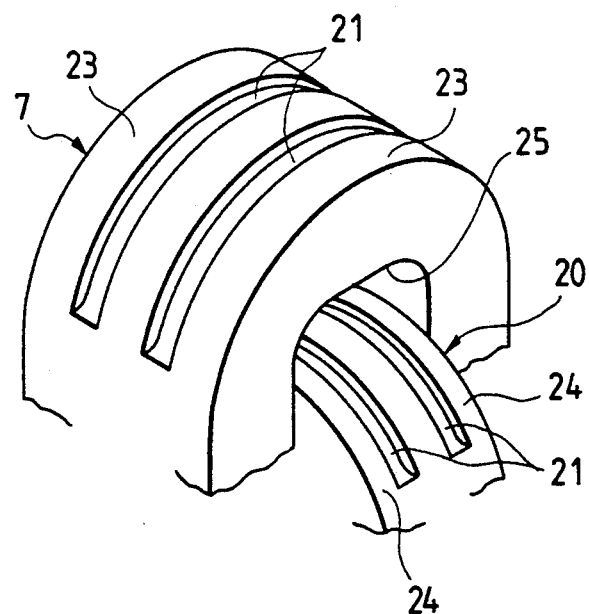
FIG. 4 is a perspective view of another example of the direction changing passage spacer built into the linear motion rolling guide unit of FIG. 3.
Figure 5:
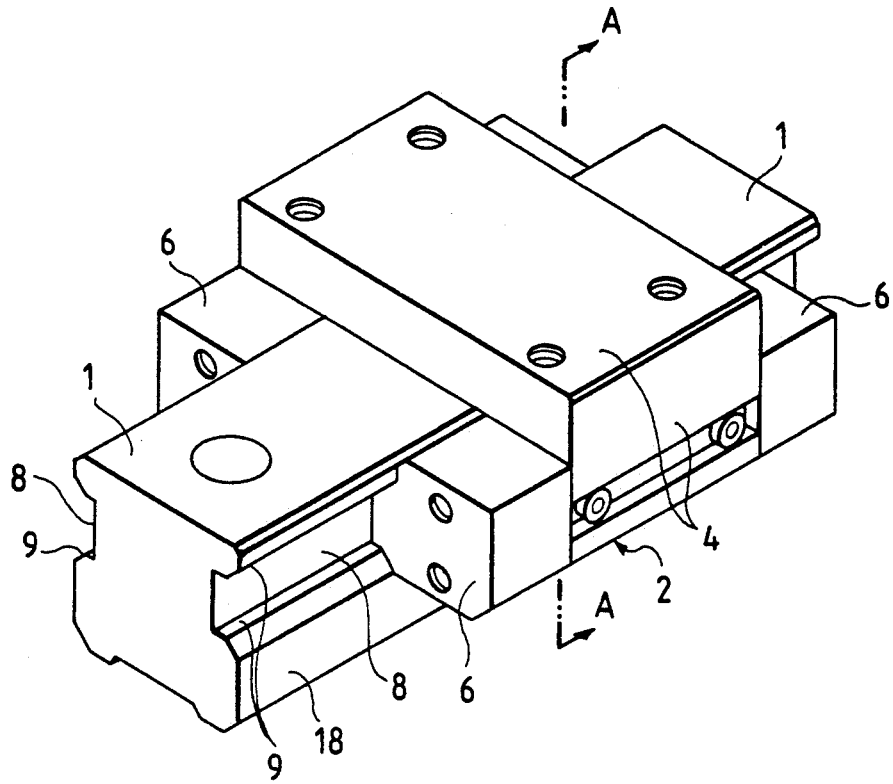
FIG. 5 is a perspective view of one example of the conventional four-raceway endless linear motion rolling guide unit.
Figure 6:
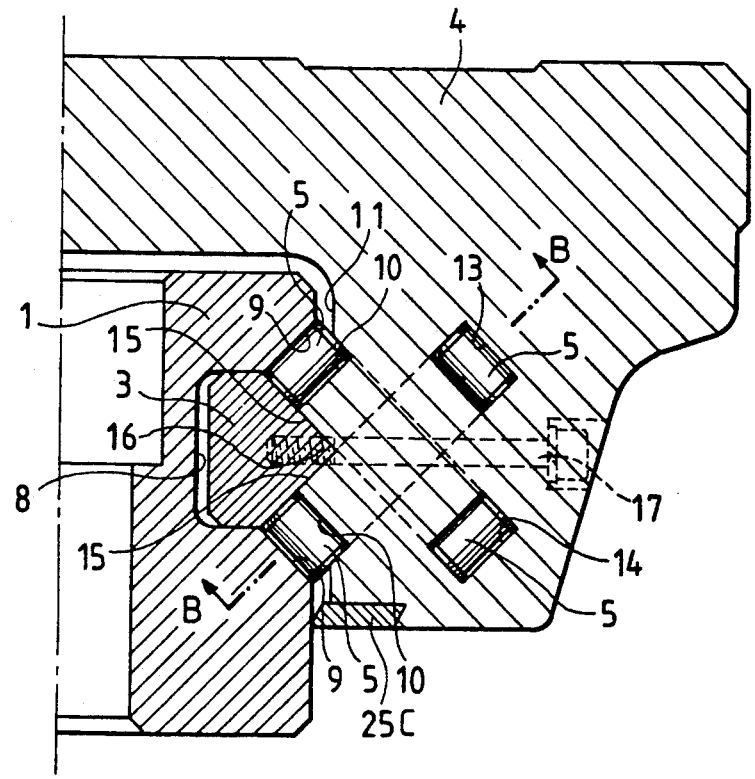
FIG. 6 is a cross section taken along the line A—A of FIG. 5.

Next, another embodiment of the linear motion rolling guide unit will be described by referring to FIG. 3 and FIG. 4. In FIGS. 3 and 4, components identical with those of FIGS. 1 and 2 are given like reference numbers. In this embodiment, the direction changing passage spacer consists of two direction changing passage spacers 7, 20 whose roller-contacting surfaces 23, 24 cross each other as shown. The roller-contacting surfaces 23, 24 of the direction changing passage spacers 7, 20 may be formed with one or more oil grooves 21 in the travel direction of the rollers as in the previous embodiment. The oil grooves 21 may be formed to extend in the direction that the rollers 5 advance as in the case of FIG. 2, or, though not shown, may be formed inclined crossing the first grooves. It is also possible to form both types of the oil grooves in the roller-contacting surfaces.

To describe in more detail, the linear motion rolling guide unit of this embodiment consists of: a track rail 1 having upper and lower raceway surfaces 9 formed longitudinally extending on both side walls thereof; a casing 4 saddling and movable on the track rail 1; and end caps 6 attached to the longitudinal ends of the casing 4. The casing 4 is formed with upper and lower raceway surfaces 10 at positions facing the upper and lower raceway surfaces 9, an upper return passage 13 and a lower return passage 14. The end cap 6 is formed with a recessed surface 11 on the side facing the casing 4. Upper and lower raceways 22, 22 are formed between the upper and lower raceway surfaces 9 on the track rail 1 and the upper and lower raceway surfaces 10 on the casing 4. The direction changing passage spacer 7 is so arranged that it faces and is spaced from the recessed arc surface 19 formed in the end cap 6. The spacer 7 has a roller-contacting surface 23 which is a raised arc surface corresponding in shape to the recessed arc surface 19 in the end cap 6. Thus, a direction changing passage 12 is formed between the roller-contacting raised arc surface 23 of the spacer 7 and the recessed arc surface 19 of the end cap 6.

The spacer 7 has a recessed arc surface 25 on the side opposite to the raised arc surface, which is curved in a direction that crosses the recessed arc surface 19 of the end cap 6. Another spacer 20 is disposed spaced from the recessed arc surface 25 of the spacer 7. The spacer 20 has a roller-contacting raised arc surface 24 which corresponds in shape to the recessed arc surface 25. Hence, another direction changing passage 12 is formed between the roller-contacting surface 24 of the spacer 20 and the recessed arc surface 25 of the spacer 7. The first direction changing passage 12 between the end cap 6 and the spacer 7 and the second direction changing passage 12 between the spacer 7 and the spacer 20 extend in directions that cross each other. One group of cylindrical rollers 5 circulate through the upper raceway 22, the direction changing passage 12 and the lower return passage 14. Another group of cylindrical rollers 5 circulate through the lower raceway 22, the direction changing passage 12 and the upper return passage 14.

It should be noted that in the linear motion rolling guide unit of this embodiment the roller-contacting raised arc surface 23 is formed with oil grooves 21 extending in the direction of movement of the rollers 5 and that the roller-contacting raised arc surface 24 is also formed with oil grooves 21 extending in the direction of roller travel. The oil grooves 21 formed in the roller-contacting surfaces 23, 24 may be formed parallel to the direction of roller movement, or formed inclined with respect to that direction.

I claim:

1. A linear motion rolling guide unit comprising:
   a track rail having raceway surfaces formed longitudinally extending on both side walls thereof;
   a casing saddling and movable on the track rail and having raceway surfaces formed at positions facing the raceway surfaces on the track rail, the casing also having return passages formed therein;
   raceways formed between the raceway surfaces on the track rail and the raceway surfaces on the casing;
   end caps attached to longitudinal ends of the casing, the end caps each having a recessed arc surface for a direction changing passage on the side facing the casing;
   a spacer for a direction changing passage so disposed that it faces and is spaced from the recessed arc surface formed in the end caps, the direction changing passage spacer having a raised arc surface corresponding in shape to the recessed arc surface;
   direction changing passages formed between the raised arc surface of the spacer and the recessed arc surface of the end cap;
   a number of rollers circulating through the raceways, the direction changing passages and the return passages;
   roller-contacting surfaces formed by the raised arc surfaces of the spacers on which the rollers roll; and
   oil grooves formed in the roller-contacting surfaces and extending in the direction of the roller travel.

2. A linear motion rolling guide unit as claimed in claim 1, wherein the oil grooves formed in the roller-contacting surfaces extend parallel to the direction of roller movement.

3. A linear motion rolling guide unit comprising:
   a track rail having raceway surfaces formed longitudinally extending on both side walls thereof;
   a casing straddling and movable on the track rail and having raceway surfaces formed at positions facing the raceway surfaces on the track rail, the casing also having first return passages and second return passages formed therein;
   first raceways and second raceways formed between the raceway surfaces on the track rail and the raceway surfaces on the casing;
   end caps attached to longitudinal ends of the casing, the end caps each having a first recessed arc surface on the side facing the casing;
   first spacers so disposed that they and are spaced from the first recessed arc surfaces formed in the end caps, the first spacers each having a first raised arc surface corresponding in shape to the first recessed arc surface, the first spacers each having a second recessed arc surface on the side opposite to the first raised arc surface, the second recessed arc surface being curved in a direction that crosses the first recessed arc surface;
   first direction changing passages formed between the first raised arc surfaces of the first spacers and the first recessed arc surfaces of the end caps;
   second spacers so disposed that they face and are spaced from the second recessed arc surfaces, the second spacers each having a second raised arc surface corresponding in shape to the second recessed arc surface;
   second direction changing passages formed between the second raised arc surfaces of the second spacers and the second recessed arc surfaces of the first spacers and extending in a direction that crosses the first direction changing passages;
   a first group of rollers circulating through the first raceways, the first direction changing passages and the first return passages;
   a second group of rollers circulating through the second raceways, the second direction changing passages and the second return passages;
   first roller-contacting surfaces formed on the first raised arc surfaces of the first spacers, on which the first group of rollers travel;
   second roller-contacting surfaces formed on the second raised arc surfaces of the second spacers, on which the second gropu of rollers travel;
   first oil grooves formed in the first roller-contacting surfaces and extending in the direction that the first group of rollers travel; and
   second oil grooves formed in the second roller-contacting surfaces and extending in the direction that the second group of rollers travel.

4. A linear motion rolling guide unit as claimed in claim 3, wherein the oil grooves formed in the roller-contacting surfaces extend parallel to the direction of roller movement.

* * * * *